United States Patent
Strawderman et al.

(10) Patent No.: US 6,382,791 B1
(45) Date of Patent: May 7, 2002

(54) METHOD FOR HELPING PERSONS WITH DYSLEXIA

(76) Inventors: Jerry A. Strawderman, 12855 Sibley Rd., Springport, MI (US) 49284-9723; Chetan Ahuja, 1102 McIntyre Dr., Ann Arbo, MI (US) 48105

( * ) Notice: Subject to any disclaimer, the term of this patent is extended or adjusted under 35 U.S.C. 154(b) by 0 days.

(21) Appl. No.: 09/469,148

(22) Filed: Dec. 21, 1999

(51) Int. Cl.[7] ................................. A61B 3/00
(52) U.S. Cl. ....................................... 351/203
(58) Field of Search ................ 351/200, 201, 351/203, 209, 210; 600/558; 128/898; 434/112, 178

(56) References Cited

U.S. PATENT DOCUMENTS

| | | | |
|---|---|---|---|
| 4,211,018 A | * | 7/1980 | DeVoid et al. ............. 434/178 |
| 4,353,626 A | | 10/1982 | Harrison |
| 4,838,681 A | * | 6/1989 | Pavlidis ...................... 351/210 |
| 5,088,810 A | | 2/1992 | Galanter et al. |
| 5,147,205 A | | 9/1992 | Gross et al. |
| 5,302,132 A | | 4/1994 | Corder |
| 5,420,653 A | | 5/1995 | Mumford |
| 5,543,867 A | | 8/1996 | Mumford |
| 5,686,982 A | | 11/1997 | Mumford |
| 5,883,694 A | | 3/1999 | Mumford |
| 6,162,059 A | * | 12/2000 | Murphy et al. ............. 434/112 |

* cited by examiner

Primary Examiner—George Manuel
(74) Attorney, Agent, or Firm—Mary M. Moyne; Ian C. McLeod

(57) ABSTRACT

The system and method of the present invention improve the visual recognition of a subject. The method uses a series of converging sets of objects (100) and includes several stages with specific types of objects (102) displayed at each stage. The types of objects which are displayed change at each stage as the subject's visual recognition improves. The subject advances through levels in each stage. The levels increase in difficulty as the subject advances through the levels of a stage. As the subject advances through the stages, the objects have more meaning in the area of communication. When the sets of objects are first displayed in the frame (104), the sets are in a spaced apart relationship. The sets are spaced apart either vertically, horizontally or diagonally. The sets are then moved towards each other. As the sets are moved together, the subject compares the objects of the sets and communicates whether the objects of one set are similar or different from the objects of another set. Upon receiving a communication from the subject, the sets of objects disappear and new sets of objects appear.

31 Claims, 6 Drawing Sheets

Microfiche Appendix Included
(1 Microfiche, 27 Pages)

METHOD FOR HELPING PERSONS WITH DYSLEXIA

CROSS-REFERENCE TO RELATED APPLICATIONS

Not Applicable

STATEMENT REGARDING FEDERALLY SPONSORED RESEARCH OR DEVELOPMENT.

Not Applicable

REFERENCE TO A "MICROFICHE APPENDIX"

This application has 1 microfiche appendix having 1 microfiche with a total number of 27 frames.

BACKGROUND OF THE INVENTION

(1) Field of the Invention

The present invention relates to a method and system for improving the optical (eye) recognition of a subject. In particular, the present invention relates to a method and system which uses sets of objects where the subject indicates whether the objects of the sets are the same or different. The method and system help subjects with dyslexia improve their optical recognition which reduces the effects of dyslexia.

(2) Description of the Related Art

Dyslexia is a well-known human problem. Dyslexia has to do with how a person's brain organizes what the person's eyes see and his ears hear. The most common illustrations of dyslexic perception are where the word is "dog" and a subject sees "bog", where the word is "pad" and the subject sees "dab" and where the word is "leon" and the subject sees "noel" or where the letter "E" is seen as a "3" by the subject. The symptoms are such that traditional methods of teaching a subject to read will not work. For persons with dyslexia, the world they perceive is different than the world people in authority describe. This mixed perception appreciably diminishes self esteem. Consequently, persons who are dyslexic tend to have contact with the social service or law enforcement agencies at an early age. Persons having dyslexia are seldom sophisticated enough to verbally explain their dilemma. This dilemma usually manifests itself in behavioral terms. The persons act out negatively seeking attention hoping the additional attention will help the care giver focus on the true problem. However, the care giver usually focuses on the negative behavior and responds only to that behavior. This sends further mixed messages to the dyslexic causing increased disillusion and a downward spiral of self esteem. A variety of compensation programs have been in place for several years. In some cases, there is sufficient compensatory input coupled with a stimulating, positive, interactively rich environment to allow the person having dyslexia to build compensations for the disability. In these cases, the person is able to maintain a near normal learning curve.

The related patent art has described various methods and apparatuses to improve a subject's visual capability and their communication skills such as reading and writing. Illustrative are U.S. Pat. No. 4,353,626 to Harrison U.S. Pat. No. 5,088,810 to Galanter et al; U.S. Pat. No. 5,147,205 to Gross et al; U.S. Pat. No. 5,302,132 to Corder and U.S. Pat. Nos. 5,420,653; 5,543,867; 5,686,982 and U.S. Pat. No. 5,883,694 to Mumford.

Harrison describes an apparatus for testing visual recognition. Galanter et al describes a vision training system to develop and enhance visual abilities and to reduce visual and other stress related symptoms associated with intense close work. The system has five (5) diagnostic tests including saccadics, visual memory, accommoflex, fusion and phoria. After the diagnostic tests, the subject participates in therapeutic exercise routines. None of the diagnostic tests or therapeutic routines are similar to the method of the present invention. In addition, the tests and routines do not achieve the same goal as the method of the present invention. Gross et al and Corder describe methods and apparatuses for teaching communication skills such as reading and spelling.

The Mumford patents describe a method for testing dyslexia and other visual incapacities and for modifying a person's environment to reduce the effects of dyslexia and to improve the person's visual capabilities. The method uses two (2) different test charts. The test charts can be on a paper sheet or on a video terminal. The first test chart includes a plurality of horizontally spaced, vertically aligned pairs of multi-digit numbers arranged in parallel columns. Some of the numbered pairs are identical. Others have various different relationships such as transposed numbers and inverted digits. The individual indicates whether each pair of numbers are the same or different. The response time is measured. The test requires an individual to focus on a particular numbered pair, and to coordinate eye and mind to conduct a comparison. The second test chart includes five (5) vertically spaced rows, each formed by a series of smaller case "O's" of equal size and equally spaced apart. The number of "O's" in each row increases with the vertical position of the row on the sheet. The individual is asked whether the "O's" appear to be spaced apart or joined together. The individual is then asked to count the "O's" in a selected row. The individual's visual capacity is measured in accordance with their ability and time taken to count the number of "O's" in each row. Once the individual is initially tested, the lighting environment is varied to improve the individual's visual capacity. The invention relieves dyslexia and other visual incapacities by testing methods combined with empirical optimization of the spectrum of the lighting and the ratio of direct to indirect lighting to achieve optimal visual capacity levels.

There remains the need for a method which will improve a subject's visual recognition ability to reduce the effects of dyslexia.

SUMMARY OF THE INVENTION

The system and method of the present invention improve the visual recognition of a subject. The method uses a series of converging sets of objects and includes several stages with specific types of objects displayed at each stage. The types of objects which are displayed change at each stage as the subject's visual recognition improves. The subject advances through levels in each stage. The levels increase in difficulty as the subject advances through the levels of a stage. As the subject advances through the stages, the objects have more meaning in the area of communication. When the sets of objects are first displayed in the frame, the sets are in a spaced apart relationship. The sets are spaced apart either vertically, horizontally or diagonally. The sets are then moved towards each other. As the sets are moved together, the subject compares the objects of the sets and communicates whether the objects of one set are similar or different from the objects of another set. Upon receiving a communication from the subject, the sets of objects disappear and new sets of objects appear. The rate of convergence of the sets is increased when the subject becomes proficient at correctly comparing the objects at a lower speed in the level.

Once the subject reaches an optimal rate of convergence in one level, the subject moves onto the next level.

The present invention relates to a method for improving the optical recognition ability of a subject which comprises the first step of providing a plurality of sets of one or more objects; the second step of randomly selecting sets of objects from the plurality of sets of objects; the third step of displaying the selected sets of objects at a display time; the fourth step of receiving a communication from the subject indicating whether the objects of each of the displayed sets are similar or different to the objects of each of the other of the displayed sets; and the fifth step of removing the sets of objects. In the sixth step, the second, third, fourth and fifth steps are repeated until a predetermined number of correct communications are received from the subject. In the seventh step the display time is decreased and the second, third, fourth, fifth and sixth steps are repeated until the display time reaches an optimum minimum display time.

Further, the present invention relates to a method for improving the optical recognition ability of a subject which comprises the first step of providing a plurality of sets of objects; the second step of randomly selecting sets of objects from the plurality of sets of objects and displaying the selected sets of objects in a spaced apart relationship; the third step of moving the selected sets of objects towards each other at a predetermined speed; the fourth step of receiving a communication from the subject indicating whether the objects of each of the displayed sets are similar or different to the objects of each of the other of the displayed sets; and the fifth step of removing the sets of objects. In the sixth step, the second, third, fourth and fifth steps are repeated. In the seventh step, the predetermined speed of movement of the sets of objects towards each other in response to a predetermined number of correct communications from the subject is increased. In the eighth step, the second, third, fourth, fifth, sixth and seventh steps are repeated.

Still further, the present invention relates to a method for improving the optical recognition ability of a subject which comprises the first step of providing a plurality of sets of objects; the second step of providing a means for displaying the plurality of sets of objects; the third step of positioning the subject so that the subject can view the displayed sets; the fourth step of displaying two of the sets of objects in an initial, spaced apart relationship; the fifth step of moving the two sets of objects towards each other at a predetermined speed; the sixth step of instructing the subject to compare the objects in the two sets and to communicate whether the objects are similar or different; and the seventh step of recording the communications from the subject. In the eighth step, the fourth, fifth, sixth and seventh steps are repeated while varying the displayed sets of objects for each repetition. In the ninth step, the predetermined speed is increased when the subject communicates a predetermined number of continuously correct communications. Finally, in the tenth step, the fourth, fifth, sixth, seventh, eighth and ninth steps are repeated.

Further still, the present invention relates to a method for improving the optical recognition ability of a subject which comprises a first step of presenting a series of first sets having first objects to the subject for a first display time and a second step of receiving first communications from the subject indicating whether the first objects of one of the first sets are similar or different to the first objects of another one of the first sets. In the third step, the first and second steps are repeated until a predetermined number of correct first communications are received from the subject. In the fourth step, the first display is decreased. In the fifth step, the first, second, third and fourth steps are repeated until first optimal minimum display time is reached. In the sixth step, a series of second sets having second objects are presented to the subject for a second display time. In the seventh step, second communications are received from the subject indicating whether the second objects of one of the second sets are similar or different to the second objects of another one of the second sets. The sixth and seventh steps are repeated in the eighth step until a predetermined number of correct second communications are received from the subject. In the ninth step, the second display time is decreased. The sixth, seventh, eighth and ninth steps are repeated in the tenth step until the second speed is equal to a second optimal minimum display time. A series of third sets having third objects are presented to the subject for a third display time in the eleventh step. In the twelfth step, third communications are received from the subject indicating whether the third objects of one of the third sets are similar or different to the third objects of another one of the third sets. The eleventh and twelfth steps are repeated in the thirteenth step until a predetermined number of correct third communications are received from the subject. In the fourteenth step the third display time is decreased. Finally in the fifteenth step, the eleventh, twelfth, thirteenth and fourteenth steps are repeated until the third speed is equal to a third optimal minimum display time.

Finally, the present invention relates to a system for improving optical recognition by a subject which comprises: a computer having a CPU, a memory, a video display and an input device; a plurality of objects stored in the memory of the computer; and a computer program in the computer enabling; (i) retrieval of the sets of objects from the memory of the computer; (ii) display of the sets of objects on the video display of the computer for a display time; (iii) receipt of a communication from the subject in response to the sets of objects on the video screen; (iv) removal of the sets of objects from the video screen in response to the communication from the subject; (v) storage of the communication from the subject in the memory of the computer; and (vi) decreasing the display time for displaying the sets of objects.

The substance and advantages of the present invention will become increasingly apparent by reference to the following drawings and the description.

DESCRIPTION OF THE PREFERRED EMBODIMENTS

Figure 1:
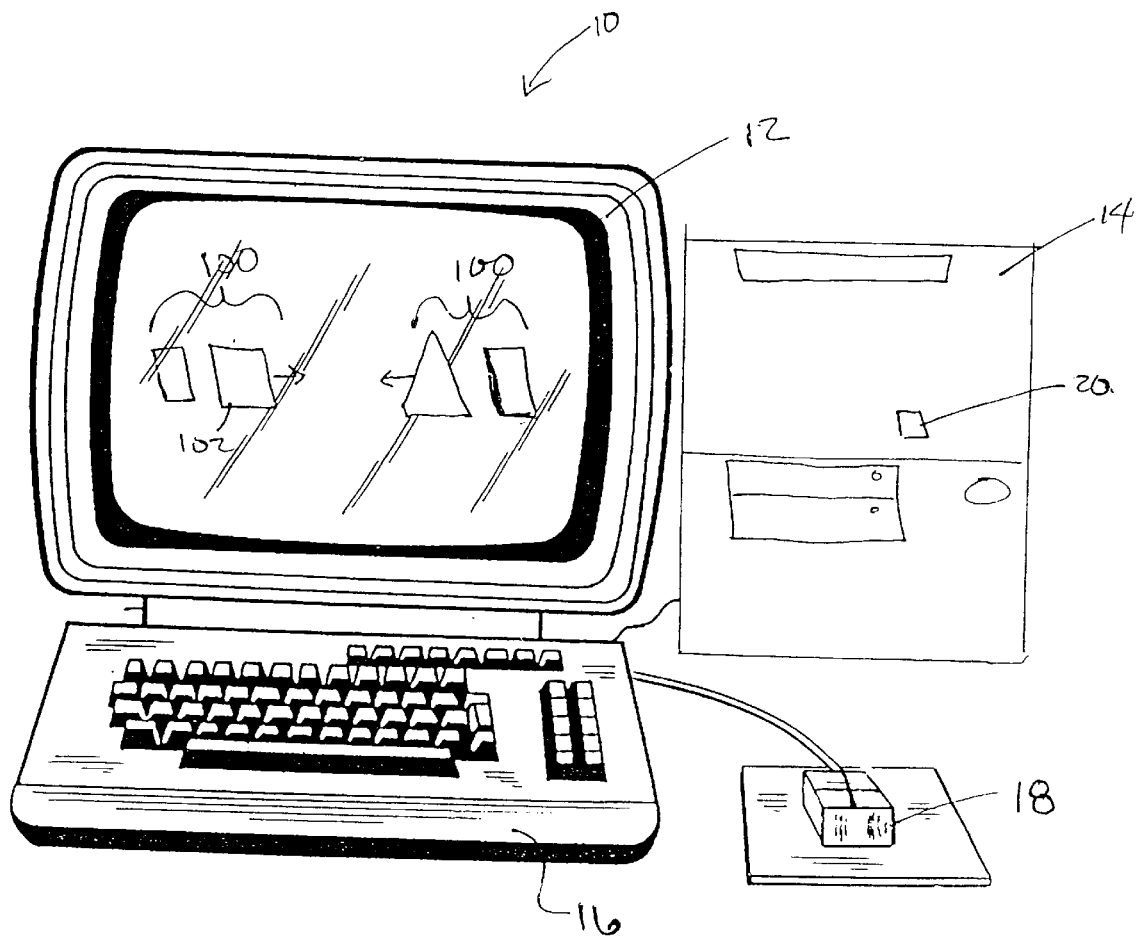
FIG. 1 is a schematic view showing the computer system 10 including the monitor 12, CPU 14 and memory 20, keyboard 16 and keypad 18.
Figure 3A:
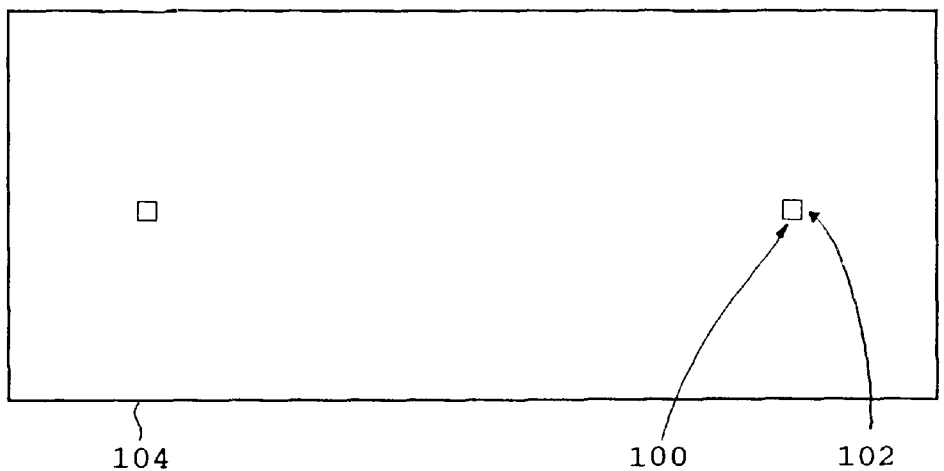
FIG. 3A is a schematic representation of a frame 104 of the first level of the first stage showing objects 102 having 2-dimensional shapes where the sets 100 converge horizontally.
Figure 3B:
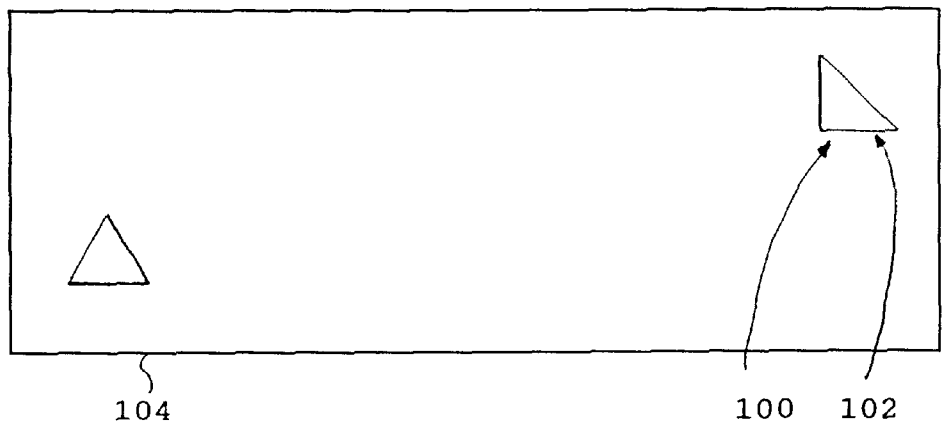
FIG. 3B is a schematic representation of a frame 104 of a level of the first stage showing objects 102 having 2-dimensional shapes and having different sizes where the sets 100 converge diagonally.
Figure 3C:
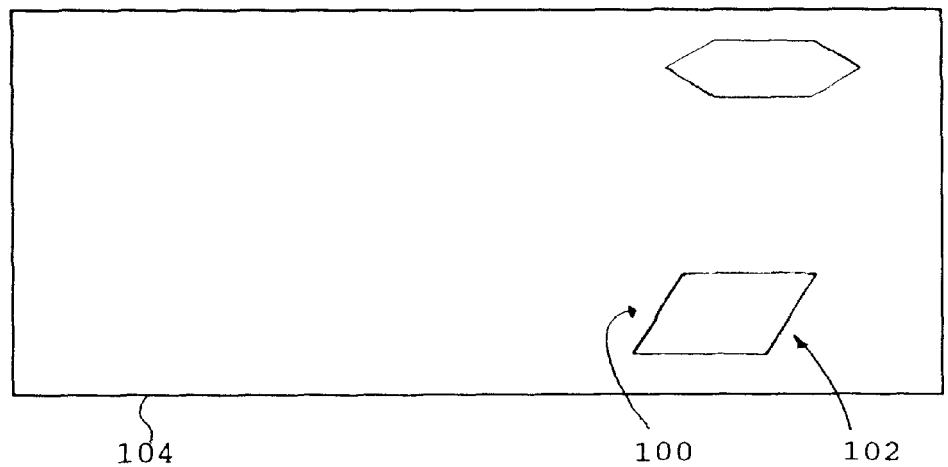
FIG. 3C is a schematic representation of a level of the first stage showing objects 102 having 2-dimensional shapes where the sets 100 converge vertically.

The method of the present invention can be performed using a variety of systems. In the preferred embodiment, the method is performed using a computer system 10 operating a computer program. The computer system 10 includes a display or monitor 12, a CPU 14 having memory 20, an input device such as a keyboard 16, and optionally a second input device such as a keypad 18 and a modem (not shown) for connection to the Internet (FIG. 1). The method uses the computer program to display a plurality of sets of objects 100. The sets of objects 100 are stored in the memory 20 of the computer system 10 and are preferably categorized into stages based on the types of objects 102 in the sets 100. The objects 102 presented are preferably geometric shapes, random letters (FIGS. 3A to 3C), alphanumeric characters without vowels (FIGS. 4A to 4D), alphanumeric characters with random meaningful communication such as alphanumeric letters which have meaning together or letters which spell words (FIGS. 5A to 5D). The sets of objects 100 are presented to the subject (not shown) in various different stages having various levels. Preferably, the stages are categorized based on the type of objects 102 in the sets 100 and the levels for each stage are categorized based on the number of objects 102 in each set 100. All levels of a single stage have the same types of objects 102. All sets 100 which are displayed in the same level have the same number and the same type of objects 102. Preferably, only two (2) sets 100 are displayed at one (1) time in a single frame 104 on the monitor 12 for comparison.

To begin the process, the subject is first evaluated to determine whether the subject is dyslexic. In the evaluation stage, the computer 10 having a computer program, monitor 12 and a color coded response pad (not shown) are used. The response pad is divided into quarters. Three (3) of the quarters have primary colors red, yellow and blue. The fourth quarter is white. The computer program slowly displays shapes on the monitor 12 to the subject. As shapes appear on the monitor 12, the subject touches one (1) quarter of the pad to indicate whether the shapes are the same or different. The subject is not told which colors represent which choice. The subject is also not told when he is right or wrong. As the subject continues with the evaluation process, the test administrator looks for a pattern within the color choices selected by the subject. The administrator looks to see what colors are primarily selected to identify the shapes and to indicate same or different. Once a pattern or lack of pattern is determined to exist, the administrator knows whether or not the subject has a dyslexia problem. If no pattern is established, then the subject has a decoding (dyslexic) dysfunction. The computer program used for the evaluation procedure can be included in the computer program used for the improvement method. However, it is understood that different evaluation procedures can be used to determine whether or not the subject is dyslexic.

The subject's color selection is also important for other areas of evaluation. If the subject predominantly chooses the color red to signify "same", this indicates anger in the home environment. For an adult subject this could also indicate anger in the subject. If the color blue is usually chosen to indicate "same", this may indicate that the subject is a slow learner but overall content. If the color yellow is chosen predominantly to indicate "same", the subject probably has a disorientated personality. If white is the color selected by the subject to indicate "same", this indicates that the subject may have serious neurological concerns.

If the evaluation determines that the subject likely has dyslexia, then the subject moves onto the improvement method. The improvement method is preferably independent of the evaluation procedure. The same computer 10 and monitor 12 can be used for the evaluation procedure as well as for the improvement procedure. However, the four (4) color response pad is replaced by the keyboard 16. It is understood that a completely different computer system 10 can be used for each procedure. Regardless of the computer system 10 used, the subject decides which two (2) colors will be used to represent same and different. The colors should be different from the four (4) colors used with the subject in the evaluation procedure. The subject then decides which two (2) keys will be used on the keyboard 16 to indicate "same" (similar) or "different". The keys are then colored with the selected colors. Alternatively, a special keypad 18 having two (2) keys can be used. In addition, for motion challenged subjects, an audio response system may be used.

Figure 2:
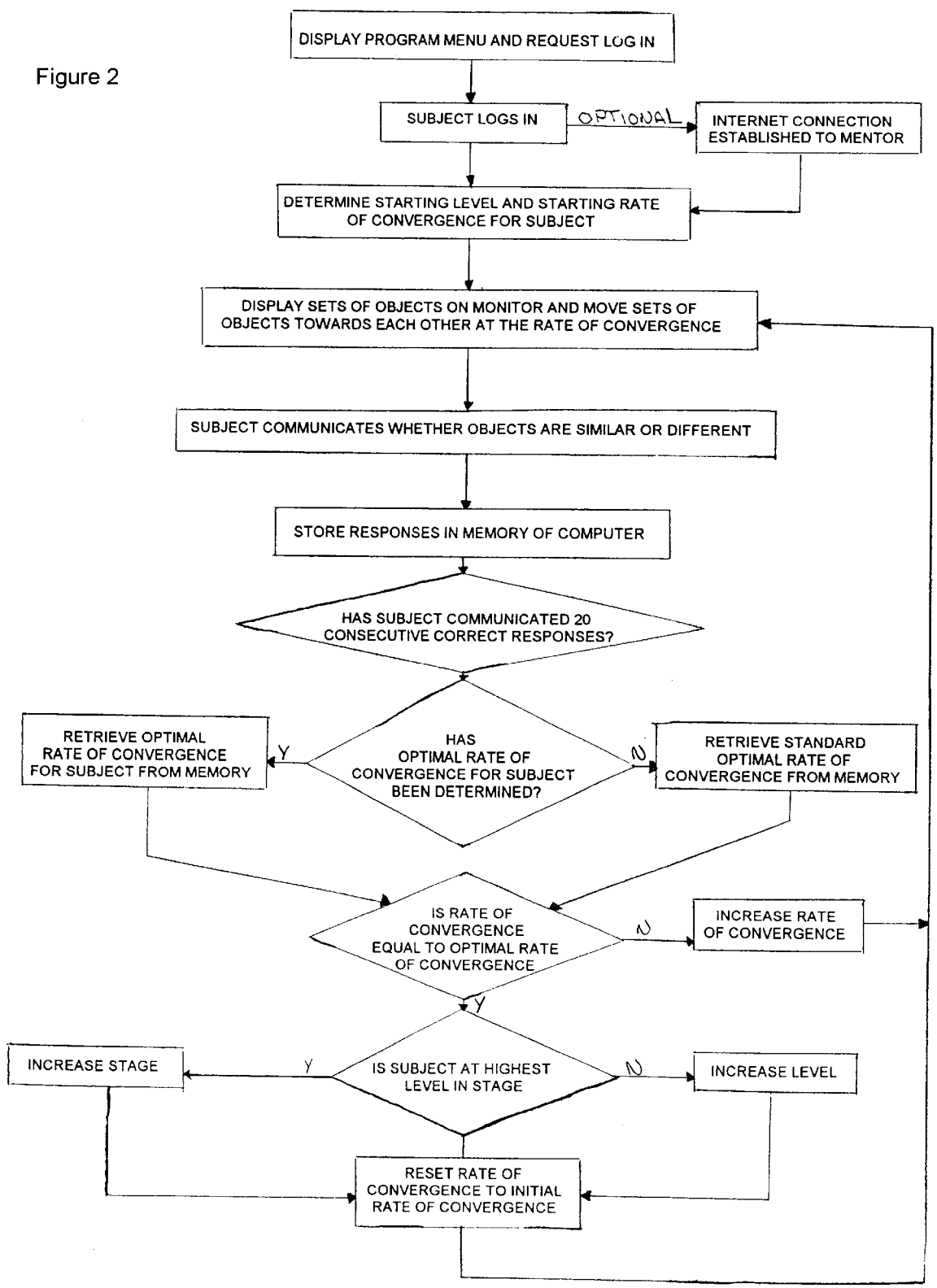
FIG. 2 is a flowchart showing the steps of the method.

Once the computer system 10 is set up, the subject can begin the improvement method by running the computer program. To begin the procedure, the subject is positioned in front of the display or monitor 12 within contact distance of the designated keys on the keyboard 16 or keypad 18 (FIG. 1). Next, the computer program is activated and the program menu is displayed on the monitor 12 (FIG. 2). The subject inputs his individual, log in identifier. If a mentor (not shown) is monitoring the progress of a subject, an Internet connection or network connection can be established. The computer program determines the starting stage and level, the starting rate of convergence of the sets of objects 100 and the direction of convergence of the sets of objects 100 (to be discussed in detail hereinafter). If the subject is just beginning the improvement process, the computer program will begin at the easiest or first level of the easiest or first stage. In the preferred embodiment, all subjects, regardless of age, begin the improvement process at the same level. However, as each individual advances through the stages and levels, whether a subject reviews all the stages and levels is based on a subject's individual progress. In some instances, for example with very young children, only some stages such as those having geometric shapes are used. If the subject has used the process before and did not successfully advance through all of the stages and levels, the computer system 10 has stored in memory 20 which stage and level the subject was on when the computer program was terminated. The subject will then continue on with the process at the last stage and level he was successful.

Preferably, the program automatically advances through the stages and levels based on the responses of the subject. In the preferred embodiment, the same procedure is used for all stages and levels of the method. As the subject moves through the process, the stages increase in difficulty. Preferably, the objects 102 of the sets 100 become more closely related to meaningful communications. In the highest stages, the sets 100 of letters or symbols preferably form meaningful communications such as words. In the preferred embodiment, at the highest stages, the sets 100 include two (2) or three (3) words which form word arrangement structures or sentences. As the subject advances through a stage, the levels increase in difficulty. In the preferred embodiment at the highest levels, each set 100 has less than 24 objects 102. Preferably, the method continues until sentences having up to six (6) words or a total of twelve (12) syllables are displayed in a frame 104.

Figure 4A:
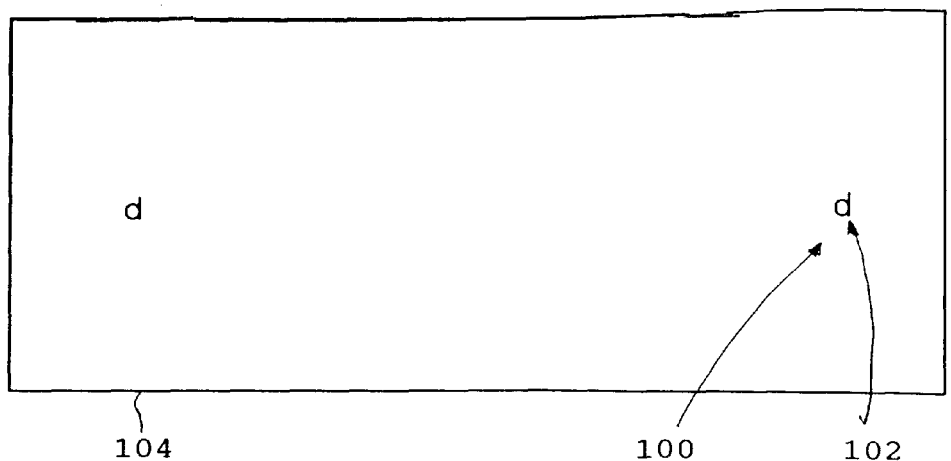
FIG. 4A is a schematic representation of a frame 104 from a level having sets 100 in a stage with one object 102 where the objects 102 are alphanumeric characters without vowels.
Figure 4B:
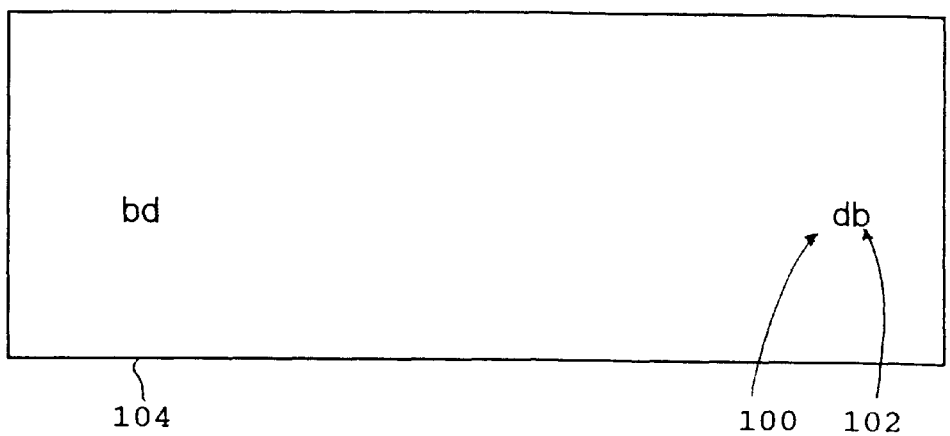
FIG. 4B is a schematic representation of a frame 104 from a level having sets 100 in a stage with two objects 102 in each set 100 where the objects 102 are alphanumeric characters without vowels.
Figure 4C:
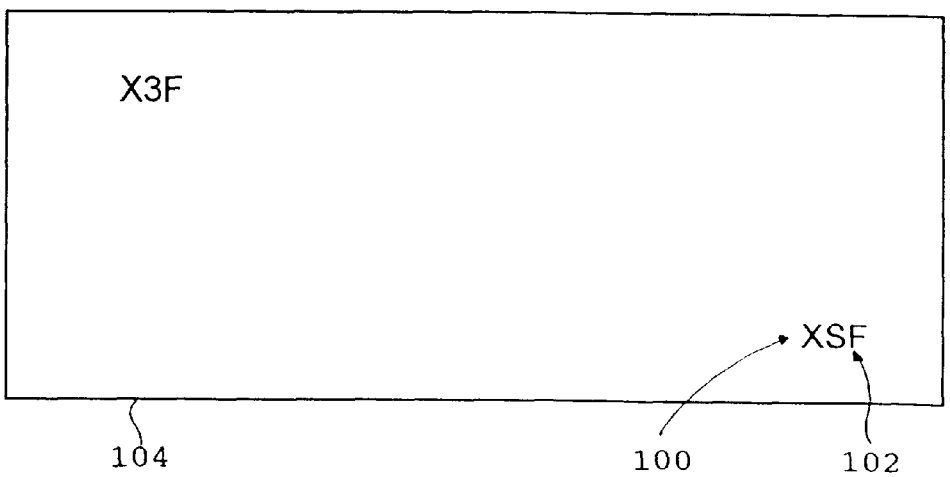
FIG. 4C is a schematic representation of a frame 104 from a level having three objects 102 in each set 100 in a stage where the objects 102 are alphanumeric characters without vowels where the sets 100 converge diagonally.
Figure 4D:
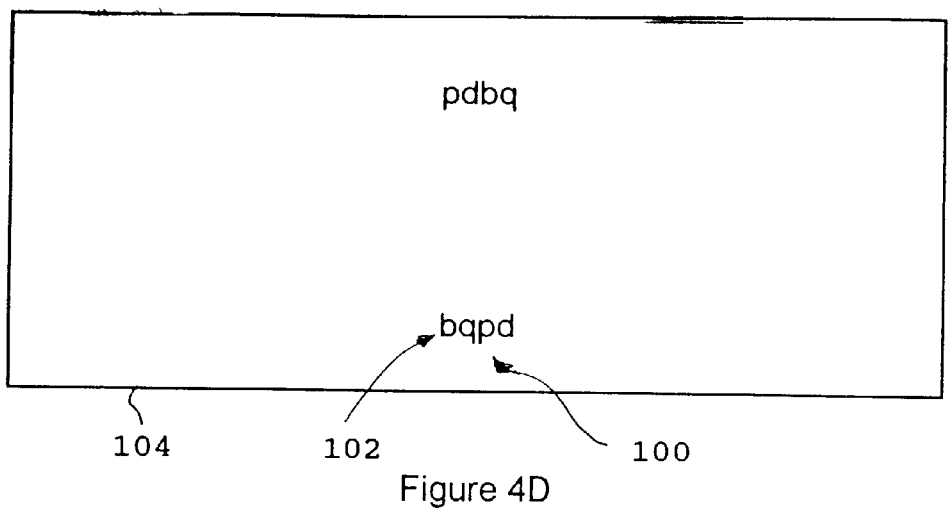
FIG. 4D is a schematic representation of a level having four objects 102 in each set 100 in a stage where the objects 102 are alphanumeric characters without vowels where the sets 100 are mirror images of each other and converge vertically.
Figure 5A:
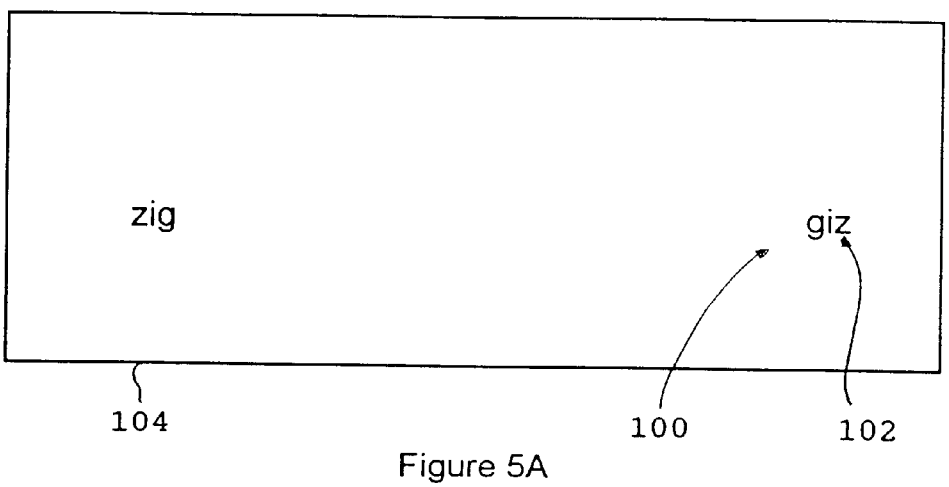
FIG. 5A is a schematic representation of a frame 104 in a level having three objects 102 in a set 100 in a stage where the objects 102 are alphanumeric characters with random meaningful communication.
Figure 5B:
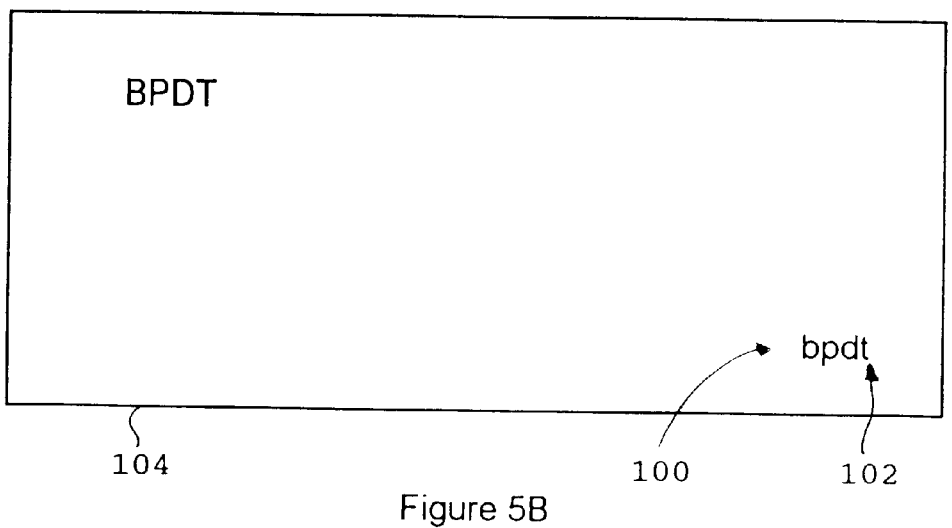
FIG. 5B is a schematic representation of a frame 104 of a level having four objects 102 in a set 100 in a stage where the objects 102 are alphanumeric characters with random meaningful communication and the sets 100 are different due to upper case versus lower case of the objects 102.
Figure 5C:
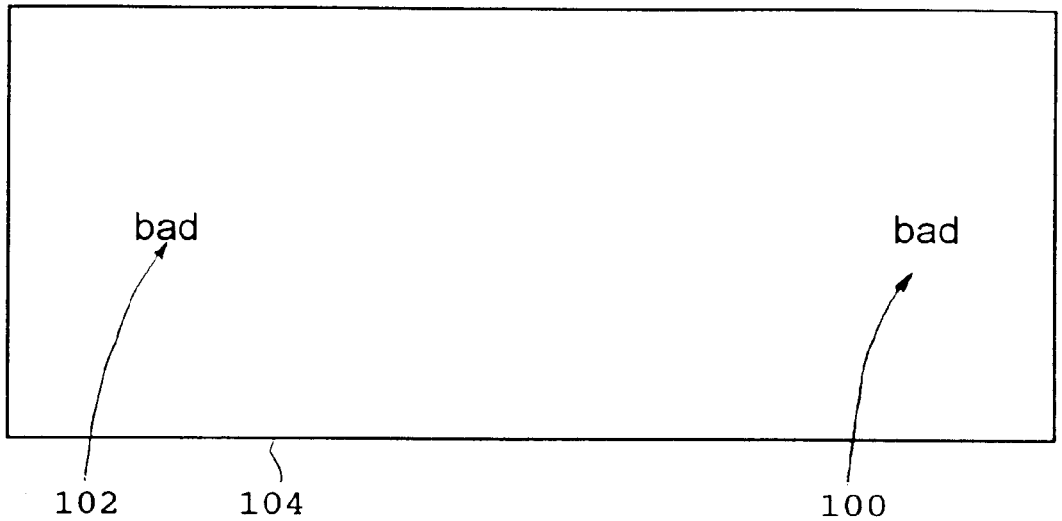
FIG. 5C is a schematic representation of a frame 104 in a level having three objects 102 in a set 100 in a stage where the objects 102 of a set 100 have meaningful communication and where the sets 100 converge horizontally.
Figure 5D:
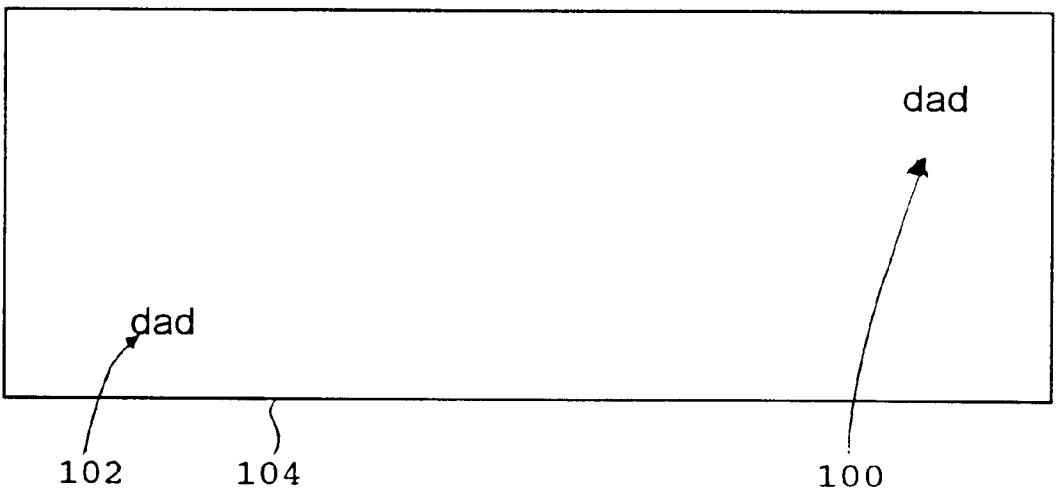
FIG. 5D is a schematic representation of a frame 104 in a level having three objects 102 in a set 100 in a stage where the objects 102 of a set 100 have meaningful communication and where the sets 100 converge diagonally.

In the preferred embodiment, the first time through the first level of the first stage is preferably considered a pretest which enables the program to determine an optimal rate of convergence or an optimal minimum display time for the subject (to be discussed in detail hereinafter). In the first level of the first stage, preferably the computer program randomly selects two (2) sets of objects 100 from the plurality of sets of objects 100 stored in the memory 20 of the computer system for this stage and level. In the preferred embodiment, the objects 102 of the sets 100 in the first stage are 2-dimensional geometric shapes (FIGS. 4A to 4C). In the pretest, each set 100 in the first level of the first stage includes only one (1) 2-dimensional shape. In the preferred embodiment, the first stage only includes one (1) level and the number of objects 102 in the sets 100 do not increase. If the subject is a young child, the process may include only one (1) stage having sets 100 with geometric shapes. In this case, the stage would have multiple levels with the number of geometric shapes in each set 100 increasing as the subject advances through the levels. Once the computer program has selected the two (2) sets 100, the computer program displays or presents the sets 100 in a frame 104 on the monitor 12. The sets 100 are originally displayed in a spaced apart relationship (FIG. 1). The sets 100 can be spaced apart vertically, horizontally or diagonally on the monitor 12. In the preferred embodiment, with a monitor 12 having a 15 inch diagonal, the sets 100 are spaced a maximum distance of 8 inches (20 cm) apart. The computer program then moves the sets of objects 100 towards each other in a linear direction. Thus, if the sets of objects 100 are spaced apart vertically, the sets of objects 100 are moved towards each other vertically. Preferably, the sets 100 are moved at a constant speed or rate of convergence and preferably the movement begins as soon as the sets 100 are displayed on the monitor 12. In the pretest of the first stage, the rate of convergence or speed of the sets 100 and the direction of convergence are preferably the same for all subjects. In the preferred embodiment, for the pretest, the rate of convergence in the first level of the first stage is about 12 seconds per inch for a display time of 60 seconds and the direction of convergence of the sets of objects 100 is preferably horizontal. As the sets 100 are moved together, the subject indicates whether the objects 102 of the sets 100 are similar or different. The objects 102 of the sets 100 must be identical. Therefore, if the objects 102 are in a different order, or are a different size or in the case of letters are different case (upper vs. lower), then the sets 100 would be considered different. The subject presses a key on the keyboard 16 or a button on the keypad 18 to communicate his answer to the computer system 100. A tone is preferably sounded by the computer system 10 when an answer is received from the subject. The response of the subject is recorded and stored in the memory 20 of the computer system 10. Once a subject communicates an answer, the sets 100 are removed from the monitor 12. The sets 100 are removed regardless of whether the answer provided by the subject is correct or incorrect. If the subject does not provide an answer before the two (2) sets 100 intersect or collide, then the two (2) sets 100 fade into each other and are removed from the monitor 12. As soon as the old sets of objects 100 are removed from the monitor 12, a new frame 104 having randomly selected new sets of objects 100 is displayed on the monitor 12. In the preferred embodiment, the next sets of objects 100 are displayed on the monitor 12 about 10 second after the previous sets 100 are removed. Preferably, the time between the old sets 100 disappearing and the new sets 100 appearing is constant within each level. Each response provided by the subject is stored in the memory 20 of the computer 10. The computer 10 tracks correct and incorrect answers. When the subject provides 20 consecutive correct answers, the rate of convergence of the sets of objects 100 is increased. As the rate of convergence is increased, the display time for the sets of objects 100 is decreased. The rate of convergence and the display time are directly related. The display time is the total time from when the sets 100 are first displayed on the screen to when the sets 100 would collide and be automatically removed from the screen. Preferably, as the rate of convergence of the sets 100 is increased and consequently, the display time is decreased, the time between the old sets 100 being removed and the new sets 100 being displayed is also decreased. Requiring at least 20 correct responses shows that the subject is able to maintain an average rate of recognition. Although using 20 correct responses has been found to be effective, the number of consecutive correct answers necessary to increase the speed may be varied depending on the subject. In the preferred embodiment, if the subject does not provide 20 consecutive answers during 100 consecutive sets of objects 100, the elemental relationship of the objects 102 of the sets 100 of the 100 presentations is explained to the subject. After the explanation, 20 more sets of objects 100 are provided to the subject for practice. The session is then ended for the day. In the next session, the subject repeats the level he was having difficulty with in the previous session. The time between the display of the sets 100 on the monitor 12 and the response from the subject is also recorded by the computer 10. The computer 10 can use this time to determine the rate at which the rate of convergence should increase.

During the pretest, the rate of convergence of the sets 100 of the first level is increased and consequently, the display time is decreased, until an optimal rate of convergence or optimal minimum display time is reached. The optimal rate of convergence and optimal minimum display time are directly related. The optimal rate of convergence is reached when even after explanations and practice the subject is unable to make 20 consecutive matches at a faster rate of convergence. In the preferred embodiment, the optimal rate of convergence reached by the subject in the pretest is the optimal rate of convergence used for the remaining stages and levels of the process. The optimal rate of convergence will vary depending on the subject. However, it has been found that about 0.25 seconds between the time the sets 100 first appear on the monitor 12 and the time the sets 100 collide and are removed is an optimal rate of convergence for most subjects. Once a subject reaches his optimal rate of convergence for a particular level, the subject moves to a new level. When a subject reaches the optimal rate of convergence in the highest level of a stage, the subject moves onto the next stage. When the subject reaches optimal rate of convergence at the highest level in the highest stage, the program can be reset and the subject can begin a new pretest at the first level of the first stage starting with the optimal rate of convergence. The subject then tries to achieve a new optimal rate of convergence and proceeds through the entire process again. Preferably, the subject only operates the process for 30 minutes each day. However, the most effective length of exposure depends on the subject.

Once the subject has successfully passed the first stage of levels having geometric shapes, the subject advances to the next stage of levels. The objects 102 of the next stage are preferably random letters with vowels omitted (FIGS. 4A to 4D). As with the earlier stage, as the subject advances through the levels of the stage, the number of objects 102 or letters is increased with each level in the stage. As the subject advances through the levels, more objects 102 are added to the sets 100. Thus, sets 100 with two (2) letters would be presented to the subject before sets 100 having four (4) letters. Preferably, the maximum number of letters in each set is six (6). In this stage of levels, the sets 100 of letters have no correlation to meaningful words. This prevents the subject from attempting to correlate what is seen with meaningful words.

In the next stage of levels, the sets 100 have at least two (2) letters which are meaningful communications when displayed together (FIGS. 5A to 5D). In this stage, vowels are included with the letters as objects 102. In the preferred embodiment, the maximum number of letters in this stage of levels is five (5) with one (1) vowel character. In the final, highest stage of levels, the objects 102 are letters which form meaningful word structures (FIGS. 5A to 5D). However, comprehension of what is being displayed is not important.

Other factors can also be varied to increase the difficulty of a set 100 without varying the number of objects 102 in a set 100. In one (1) example, the direction of convergence of the sets 100 may also be varied (FIGS. 4A to 4C). Preferably in a single level, the subject is presented a selection of sets 100 which converge in the same direction. For example, the sets 100 could be moved horizontally in one (1) level, vertically in the next level, and diagonally in the next level. However, one (1) level could include varying the direction of convergence from frame 104 to frame 104. The subject could achieve different optimal rates of convergence for different directions of convergence. Preferably, the rate of convergence of the sets of objects 100 and the direction of motion of the sets of objects 100 is adjusted dependent on the responses of the subject. Further, in addition to increasing the objects 102 in each set 100 in each frame 104 in each level, the size of the objects 102 as between sets 100 in a frame 104 can be varied.

Although the present invention is easier and more efficient when used with a computer system 10, the method could also be achieved using flash cards having the sets of objects 100. The sets of objects 100 can be displayed on flash cards and the flash cards moved together. The subject could verbally indicate whether the objects 102 are the same or different. This form of the method however would be very labor intensive for the administrator or mentor. In addition, it would be subject to human error.

In the preferred embodiment, the desired outcome of the method is the elimination of the dyslexic syndrome. It is believed that the method improves a subject's optical recognition which in turn reduces dyslexia in the subject. The method achieves a direct print on the subject's brain without the subject having to think i.e. without cognitive response.

In the preferred embodiment, the complete method is completed between about 18 and 24 months. This process can be used with subjects of any age. In the preferred embodiment, the objects 102 of the sets 100 are selected based on the age of the subject. However, the subject would need to be able to communicate a response. Preferably, the youngest subject is about 3 years old.

It is intended that the foregoing description be only illustrative of the present invention and that the present invention be limited only by the hereinafter appended claims.

We claim:

1. A method for improving the optical recognition of a subject which comprises the steps of:
    (a) providing a plurality of sets of one or more objects;
    (b) randomly selecting sets of objects from the plurality of sets of objects;
    (c) displaying the selected sets of objects at a display time;
    (d) receiving a communication from the subject indicating whether the objects of each of the displayed sets are similar or different to the objects of each of the other of the displayed sets;
    (e) removing the sets of objects;
    (f) repeating steps (b), (c), (d) and (e) until a predetermined number of correct communications are received from the subject; and
    (g) decreasing the display time and repeating steps (b), (c), (d), (e), (f) and (g) until the display time reaches an optimum minimum display time.

2. The method of claim 1 wherein the objects are geometrical shapes.

3. The method of claim 1 wherein the objects are random alphanumeric characters.

4. The method of claim 1 wherein the objects are meaningful, language orientated alphanumeric characters.

5. The method of claim 1 wherein the sets of objects are initially displayed in a spaced apart relationship and are moved together at the predetermined speed.

6. The method of claim 1 wherein only two sets of objects are displayed.

7. A method for improving the optical recognition of a subject which comprises the steps of:
    (a) providing a plurality of sets of objects;
    (b) randomly selecting sets of objects from the plurality of sets of objects and displaying the selected sets of objects in a spaced apart relationship;
    (c) moving the selected sets of objects towards each other at a rate of convergence;
    (d) receiving a communication from the subject indicating whether the objects of each of the selected sets are similar or different to the objects of each of the other of the selected sets;
    (e) removing the sets of objects;

(f) repeating steps (b) through (e) until a predetermined number of correct communications are received from the subject;

(g) increasing the rate of convergence of the sets of objects towards each other; and (h) repeating steps (b) through (g).

8. The method of claim 7 wherein the rate of convergence is increased after 20 correct communications.

9. The method of claim 7 wherein the plurality of sets are divided into different categories.

10. The method of claim 9 wherein when the rate of convergence reaches an optimal rate of convergence, the sets of objects are then selected from a different category.

11. The method of claim 10 wherein the optimal rate of convergence is such that new sets are displayed every ¼ of a second.

12. A method for improving the optical recognition of a subject which comprises the steps of:

(a) providing a plurality of sets of objects;

(b) providing a means for displaying the plurality of sets of objects;

(c) positioning the subject so that the subject can view the displayed sets;

(d) displaying some of the sets of objects in an initial, spaced apart relationship;

(e) moving the sets of objects towards each other at a rate of convergence;

(f) instructing the subject to compare the objects in the sets and to communicate whether the objects are similar or different;

(g) recording the communication from the subject;

(h) repeating steps (d) through (g) and varying the displayed sets of objects for each repetition;

(i) increasing the rate of convergence when the subject communicates a predetermined number of continuously correct communications; and (j) repeating steps (d) through (i).

13. The method of claim 12 wherein the means for displaying the plurality of sets of objects is a video screen connected to a computer system having a memory and a computer program and wherein the plurality of sets of objects are stored in the memory of the computer system and the computer program retrieves sets of objects from the memory and displays the sets of objects on the video screen.

14. The method of claim 12 wherein an amount of time from the displaying of the sets of objects to receiving the communication from the subject is recorded.

15. The method of claim 12 wherein the sets of objects are removed from the screen either when the communication is received from the subject or when the sets of objects are moved into contact with each other.

16. A method for improving the optical recognition of a subject which comprises the steps of:

(a) presenting a series of first sets having first objects to the subject for a first display time;

(b) receiving first communications from the subject indicating whether the first objects of one of the first sets are similar or different to the first objects of another one of the first sets;

(c) repeating steps (a) and (b) until a predetermined number of correct first communications are received from the subject;

(d) decreasing the first display time;

(e) repeating steps (a), (b), (c) and (d) until a first optimal minimal display time is reached;

(f) presenting a series of second sets having second objects to the subject for a second minimal display time;

(g) receiving second communications from the subject indicating whether the second objects of one of the second sets are similar or different to the second objects of another one of the second sets;

(h) repeating steps (f) and (g) until a predetermined number of correct second communications are received from the subject;

(i) decreasing the second display time;

(j) repeating steps (f), (g), (h) and (i) until the second speed is equal to a second optimal minimal display time;

(k) presenting a series of third sets having third objects to the subject for a third display time;

(l) receiving third communications from the subject indicating whether the third objects of one of the third sets are similar or different to the third objects of another one of the third sets;

(m) repeating steps (k) and (l) until a predetermined number of correct third communications are received from the subject;

(n) decreasing the third display time; and (o) repeating steps (k), (l), (m) and (n) until the third speed is equal to a third optimal minimal display time.

17. The method of claim 16 wherein the first objects are geometric shapes, the second objects are random alphanumeric characters and the third objects are meaningful, language orientated alphanumeric characters.

18. The method of claim 16 wherein a computer system is provided having a video display and wherein the first, second and third sets are presented on the video display.

19. The method of claim 18 wherein the computer system presents two sets of objects on the video screen and wherein the subject communicates whether the objects of the two sets are similar or different.

20. The method of claim 19 wherein the sets of objects appear on the video screen in a spaced apart relationship and wherein the two sets of objects move towards each other at a rate of convergence related to the first, second or third display times.

21. The method of claim 20 wherein the sets of objects are spaced apart vertically on the video display and move vertically towards each other.

22. The method of claim 20 wherein the sets of objects are spaced apart, horizontally on the video display and move horizontally towards each other.

23. The method of claim 16 wherein a color pad having colored keys is provided and wherein the subject communicates whether the objects are similar or different by touching one of the colored keys on the color pad.

24. The method of claim 16 wherein the communications from the subject are recorded.

25. The method of claim 16 wherein a time from when the sets of objects are presented to the subject to when the subject communicates whether the sets are similar or different is recorded.

26. The method of claim 16 wherein the first optimal minimal display time, second optimal minimal display time and the third optimal minimal display time are all equal.

27. A system for improving the optical recognition by a subject which comprises:

(a) a computer having a CPU, a memory, a video display and an input device;

(b) a plurality of objects stored in the memory of the computer; and
(c) a computer program in the computer enabling;
  (i) retrieval of the sets of objects from the memory of the computer;
  (ii) display of the sets of objects on the video display of the computer for a predetermined display time;
  (iii) receiving of a communication from the subject in response to the sets of objects on the video screen;
  (iv) removing of the sets of objects from the video screen in response to the communication from the subject;
  (v) storing of the communication from the subject in the memory of the computer; and
  (vi) decreasing the display time for displaying the sets of objects.

28. The system of claim 27 wherein the input device is a keypad having two buttons where one of the buttons represents the objects of the set are similar and wherein the other one of the buttons represents the objects of the set are different.

29. The system of claim 27 wherein the computer program removes the sets of objects from the video screen if the sets of objects touch before the communication is received from the subject.

30. The system of claim 27 wherein the first sets of first objects and second sets of second objects are stored in the memory of the computer wherein the computer retrieves and displays first sets of objects and wherein when a display time of the first sets of objects reaches an optimal minimal display time, the computer program retrieves and displays second sets of second objects on the video screen.

31. The system of claim 30 wherein the third sets of third objects are stored in the memory of the computer, wherein when a display time on the second sets of second objects reaches the optimal minimal display time, the computer program retrieves and displays third sets of third objects on the video screen.

* * * * *